(12) United States Patent
Lamoureux

(10) Patent No.: US 6,419,833 B1
(45) Date of Patent: Jul. 16, 2002

(54) MAGNETIC FILTRATION METHOD FOR MINIMIZING RADIOACTIVE WASTE DURING ABRASIVE WATERJET CUTTING

(75) Inventor: Edward F. Lamoureux, Hampden, MA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/704,672

(22) Filed: Nov. 3, 2000

Related U.S. Application Data

(62) Division of application No. 09/265,824, filed on Mar. 10, 1999, now Pat. No. 6,156,194.
(60) Provisional application No. 60/093,796, filed on Jul. 23, 1998.

(51) Int. Cl.[7] .............................................. B01D 35/06
(52) U.S. Cl. ....................................... 210/695; 210/805
(58) Field of Search ................................ 210/222, 223, 210/695, 805, 806; 209/214, 215, 232; 451/88

(56) References Cited

U.S. PATENT DOCUMENTS

| | | | | |
|---|---|---|---|---|
| 3,456,797 A | * | 7/1969 | Marriott | 210/695 |
| 5,001,870 A | * | 3/1991 | Yokota et al. | 51/410 |
| 5,147,554 A | * | 9/1992 | Heck | 210/695 |
| 5,637,029 A | * | 6/1997 | Lehane | 451/39 |

FOREIGN PATENT DOCUMENTS

JP 63-16016 * 1/1998 .................. 210/695

* cited by examiner

*Primary Examiner*—Matthew O. Savage

(57) ABSTRACT

A method of separating radioactive cut material from non-radioactive abrasive cutting material is disclosed herein. The method includes the steps: determining a magnetic susceptibility of a radioactive material to be cut; selecting a magnetic susceptibility of a radioactive material to be used with a water jet cutting tool such that the abrasive cutting material has a different magnetic susceptibility than the radioactive material to be cut; capturing a mixture of radioactive cut material and abrasive material generated during operation of the water jet cutting tool; and separating the radioactive cut material from the abrasive cutting material using a magnetic filter.

11 Claims, 2 Drawing Sheets

MAGNETIC FILTRATION METHOD FOR MINIMIZING RADIOACTIVE WASTE DURING ABRASIVE WATERJET CUTTING

RELATED APPLICATIONS

This application is a divisional application of U.S. patent application Ser. No. 09/265,824 filed on Mar. 10, 1999, now U.S. Pat. No. 6,156,194, and claims the benefit of U.S. Provisional Application Ser. No. 60/093,796 filed on Jul. 23, 1998. The subject matter of this application is related to the Applicant's copending applications titled "Filtration System for Concentrating Radioactive Debris," "Container for Handling and Storing Radioactive Debris," and "System and Method of Sealing Container for Handling Radioactive Debris" (Application Ser. Nos. 09/265,823; 09/265,826 and 09/265,825, respectively), all of which are being filed concurrently with the present application and are incorporated herein by reference.

BACKGROUND OF THE INVENTION

1. Field of the Invention

The present invention relates generally to abrasive waterjet cutting and disposal of radioactive material. In particular, the present invention relates to systems and processes that separate waterjet abrasive material from high level radioactive material cut by an abrasive waterjet process to minimize the amount of high level radioactive material for handling and disposal.

2. Description of the Related Art

Abrasive waterjet cutting is a process where a high pressure water source is forced through a nozzle and mixed with an abrasive medium. The high speed jet of water is dynamically unstable and breaks into small droplets that accelerate the solid abrasive particles. This high velocity abrasive slurry micro-machines a workpiece by causing erosion, shearing and failure due to rapidly changing localized stresses. The workpiece particles and abrasive particles are mixed as a result of the cutting process.

The abrasive waterjet cutting process requires several times the mass and volume of abrasive particles to perform the cut than are removed from the workpiece in the kerf of the cut. Therefore, when cutting radioactive materials, the mixture of the abrasive particles and workpiece particles represents an increased volume of high level radioactive material that must be handled and stored.

Waterjet cutting processes are commonly used during the dismantling of nuclear reactors. For example, waterjet cutting processes are often used on radioactive components, such as nuclear reactor internals, vessels, and other activated or contaminated materials and structures. These radioactive components are normally cut using a waterjet cutting process in a reactor vessel cavity, spent fuel pool or other underwater pool or cell.

The mixture of waterjet abrasive material and high level radioactive material removed during watejet cutting processes is considered unstable unless it is captured and stored in high integrity containers. The handling and storage of large volumes of such radioactive material is expensive and takes up a large amount of the limited space available for storing the material. Thus, there is a need for a system that separates non-radioactive abrasive material from the high level radioactive material so that the materials can be disposed of separately, thereby reducing handling concerns and disposal costs.

SUMMARY OF THE INVENTION

It is an object of the present invention to provide a system for separating a sufficient amount of radioactive material from non-radioactive material in a fluid stream to reduce the volume and cost of disposal of radioactive waste.

It is a further object of the present invention to provide a magnetic filtration system that removes a magnetic material from a fluid stream containing both magnetic and nonmagnetic waste materials to reduce the volume and cost of disposal of radioactive waste.

It is yet a further object of the present invention to provide a system that separates waterjet abrasive material from radioactive material cut by an abrasive waterjet process, whereby the radioactive material can be handled and stored separately from the abrasive material to minimize handling and disposal costs.

It is a still further object of the present invention to provide a magnetic filtration system that removes both abrasive material and radioactive cut material from a fluid stream using a magnetic filter where differentiation between the materials based on magnetic susceptibilities is not possible or practical, thereby minimizing secondary waste caused by the use of consumable cartridge filters.

According to a broad aspect of the present invention, a magnetic filtration system is provided for separating radioactive cut material from a fluid stream containing a mixture of the radioactive cut material and a nonradioactive abrasive cutting material. The system comprises a magnetic filter in fluid communication with the fluid stream. The magnetic filter has a first outlet for discharging material having a high magnetic susceptibility and a second outlet for discharging material having a low magnetic susceptibility. By selecting an abrasive cutting material having a different magnetic susceptibility than the radioactive material being cut, the magnetic filter can separate the abrasive cutting material from the radioactive cut material.

The abrasive cutting material can be a cast steel, stainless steel, shot or other material having a high magnetic susceptibility relative to the radioactive material being cut. Alternatively, the abrasive cutting material can be a garnet, alluvial or other material having a low magnetic susceptibility if the radioactive material being cut has a high magnetic susceptibility. In cases where the abrasive and the radioactive material being cut both have high magnetic susceptibility, the magnetic filter can be used to capture both the abrasive and radioactive material, thereby minimizing or eliminating secondary waste caused by the use of consumable cartridge filters.

According to another broad aspect of the present invention, a closed-loop filtration system is provided for removing radioactive particulate from a volume of fluid. The filtration system comprises: an enclosure submerged in a fluid volume for isolating a portion of the fluid volume from a remainder of the fluid volume; a capture structure for capturing abrasive cutting material and radioactive cut particulate generated within the enclosure; and a separating arrangement in fluid communication with the capture structure for receiving a fluid stream containing the abrasive cutting material and the radioactive cut particulate, the separating arrangement comprising a filter for separating the abrasive cutting material from the radioactive cut particulate, and an outlet that returns the fluid back into the enclosure.

The closed-loop filtration system according to this aspect of the invention has a magnetic filter for separating the abrasive cutting material from the radioactive cut material. The abrasive cutting material is selected so that it has a different magnetic susceptibility than the radioactive material to be cut, thereby allowing the magnetic filter to separate the high level radioactive materials from the low level abrasive materials for separate handling and disposal.

A filtering arrangement is placed in fluid communication with the magnetic separating arrangement. The filtering arrangement comprises a plurality of filters that remove the radioactive cut particulate from the fluid stream in multiple stages according to a size of the particulate. After filtering, the fluid from the fluid stream is returned to the isolated portion of the fluid volume in a closed-loop fashion.

According to another broad aspect of the present invention, a method of separating radioactive cut material from nonradioactive abrasive material is provided, comprising the steps of: determining a magnetic susceptibility of a radioactive material to be cut; selecting an abrasive material to be used with a waterjet cutting tool such that the abrasive material has a different magnetic susceptibility than the radioactive material to be cut; capturing a mixture of radioactive cut material and nonradioactive abrasive material generated during operation of the waterjet cutting tool; and separating the radioactive cut material from the nonradioactive abrasive material using a magnetic filter. The step of selecting an abrasive cutting material comprises selecting an abrasive cutting material with a high magnetic susceptibility if the radioactive cut material has a low magnetic susceptibility, and selecting an abrasive cutting material with a low magnetic susceptibility if the radioactive cut material has a high magnetic susceptibility.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

Figure 1:
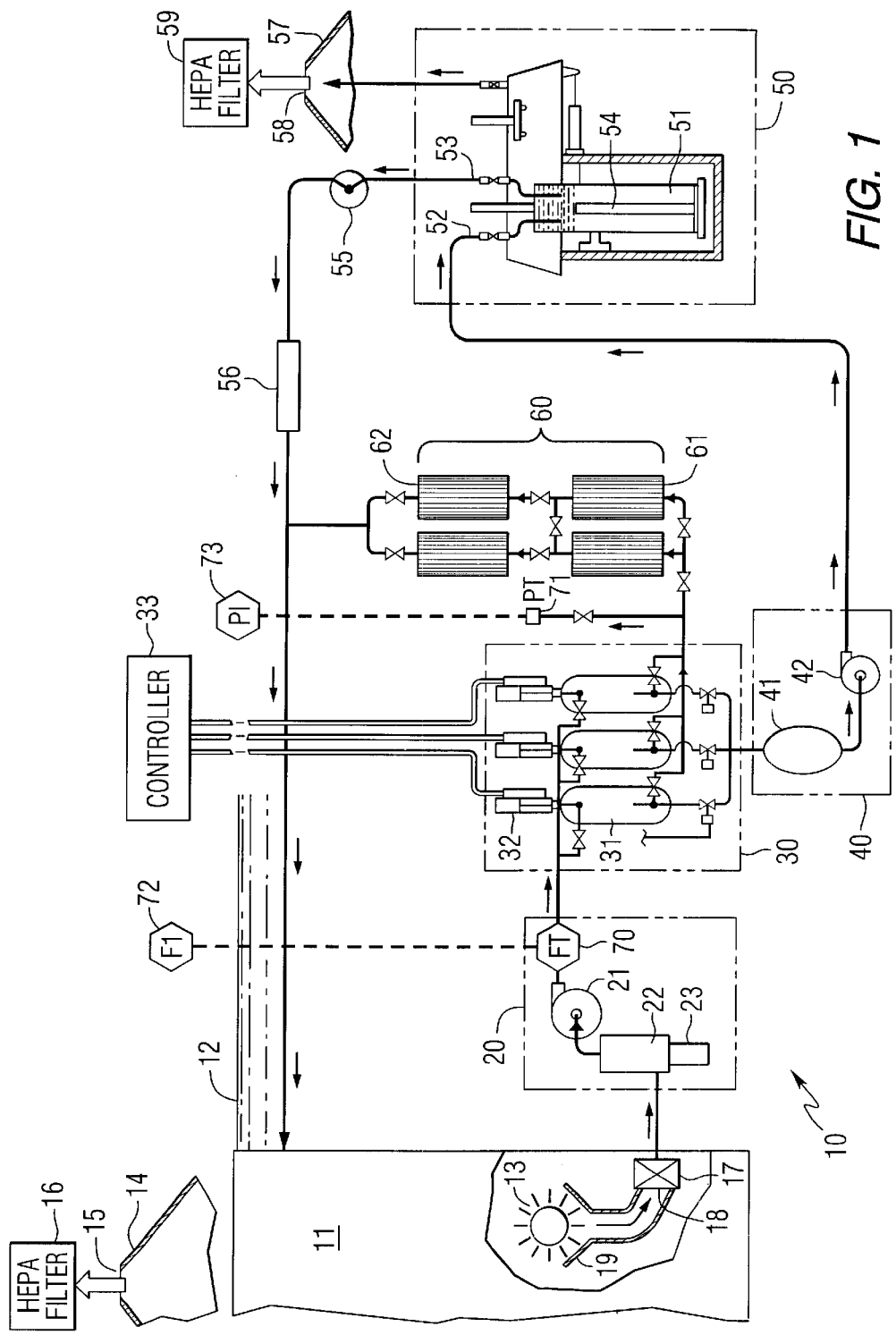
FIG. 1 is a schematic of a closed-loop filtration system for filtering, concentrating and transporting radioactive debris generated from an abrasive waterjet cutting operation.
Figure 2:
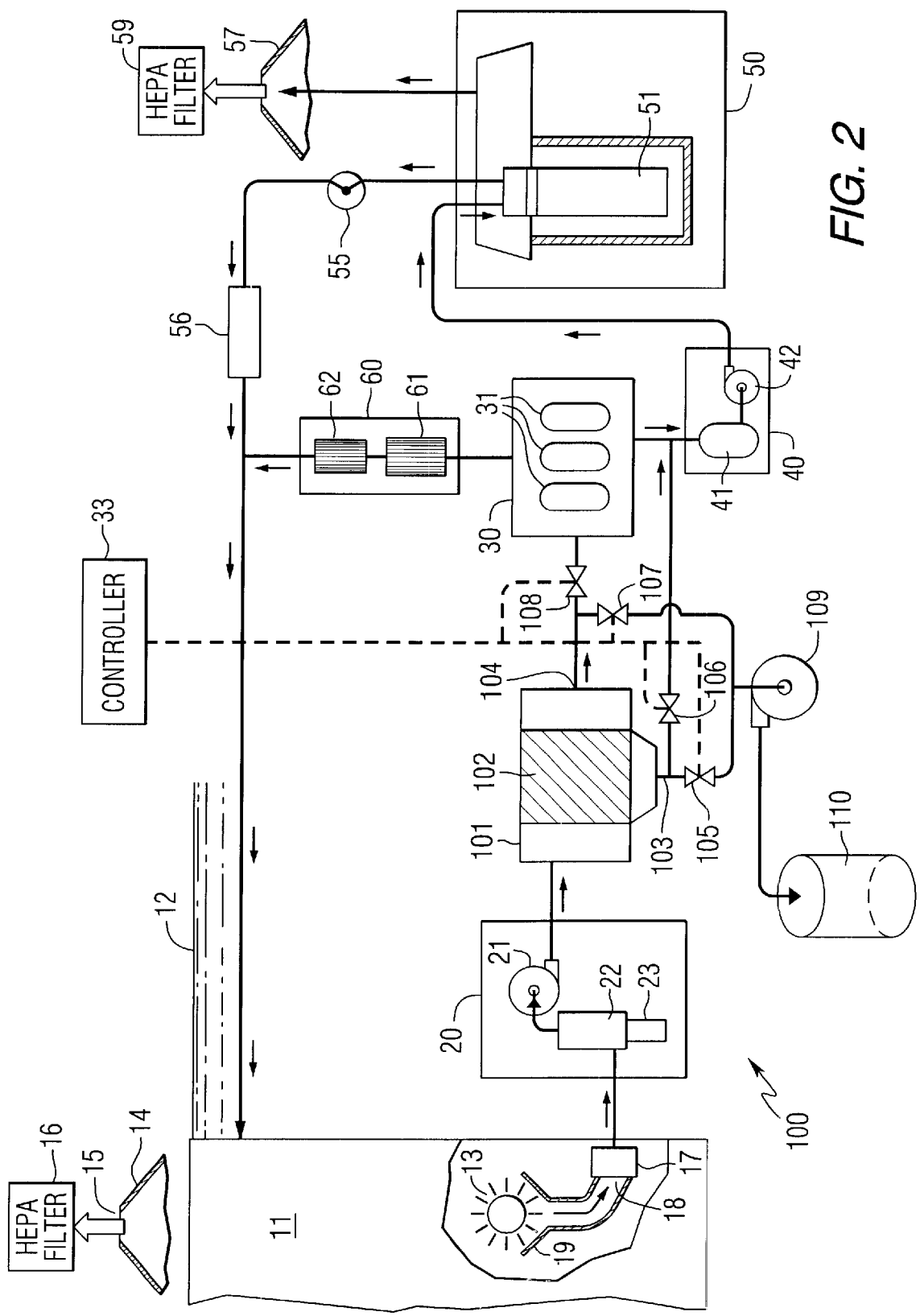
FIG. 2 is a schematic of a closed-loop filtration system equipped with a magnetic filter for separating radioactive material from nonradioactive material according to the present invention.

A magnetic filtration system 100 for separating, filtering, concentrating, and transporting radioactive debris particulate according to a preferred embodiment of the present invention will be described below with reference to FIG. 2. However, first the Applicant's related filtration system 10, which does not include a magnetic filter, will be described with reference to FIG. 1 of the drawings.

The filtration system 10 uses a cut zone enclosure 11 submerged in a water volume 12 for isolating a portion of the water volume from a remainder of the water volume. The cut zone enclosure 11 provides an area in which an abrasive waterjet cutting tool 13 can be operated, for example, during the dismantling of nuclear reactor internals. The cut zone enclosure 11 keeps the radioactive particulate generated during the cutting process separate from the remainder of the water volume 12 to prevent or minimize contamination of the general pool area water. A floating hood 14 is placed over the cut zone enclosure 11 and has an outlet 15 in communication with a HEPA gas filtration system 16 for purging gas from an area above the cut zone enclosure 11.

A header 17 having a suction opening 18 is provided in the cut zone enclosure 11 to draw contaminated water from the cut zone enclosure 11. A capture shroud 19 surrounds the suction opening 18 to facilitate the capture of radioactive debris particulate from a desired area within the cut zone enclosure 11. The radioactive debris particulate contains a mixture of waterjet abrasive material and high level radioactive material cut by the abrasive waterjet process.

A flushing pump module 20 has a flushing pump 21 that creates a suction for drawing contaminated water from the suction opening 18 within the cut zone enclosure 11. The flushing pump module 20 also contains a separator 22 that removes large size particulate, such as chips or slag from thermal processes, from the contaminated water. The separator 22 includes a settling tank, a cyclone and/or a screen on the inlet to separate out the large size particulate. The separated large size particulate is moved from the separator 22 into a transfer canister 23. The transfer canister 23 provides a means to remotely move the large size particles into disposal containers/casks used to remove the waste for burial or storage elsewhere. The settling tank, cyclone, and/or screen of the separator 22 are sized such that the large size particles removed by the separator 22 are of a size that can be mixed and disposed with solid waste, such as larger segmented parts of the reactor vessel or internals or other components, without the need for added stabilization. Thus, the large size particles removed by the separator 22 of the flushing pump module 20 need not be encapsulated by binding in a solid matrix, or sealing in separate high integrity containers, as required by either the Code of Federal Regulations, local or state regulatory requirements for certain smaller size radioactive particles.

A water flow out of the flushing pump 21 of the flushing pump module 20 (now absent the larger size particles) is directed into a solid media filter module 30. The solid media filter module 30 contains a plurality of solid media filters 31 (a commercially available product) that concentrate medium size particles, i.e., typically in the size range of 15 to 50 microns. Within the solid media filters 31, the water flow travels from the inside to the outside of a fine metal mesh matrix (i.e., strainer). Particles that will not pass through the mesh are concentrated in the bottom of a vessel within the solid media filters 31 by a slowly reciprocating wiper piston 32. On either a preset pressure drop or timing cycle, a controller 33 momentarily opens a dump valve and ejects the concentrated particles from the solid media filters 31.

A concentrate handling module 40 receives the concentrated particulate ejected from the solid media filters 31. The concentrate handling module 40 has a purge tank 41 maintained at a pressure sufficiently below an internal pressure of the solid media filters 31 to provide the pressure differential necessary for ejecting the concentrate from the solid media filters 31. A transfer pump 42 intermittently moves the concentrated slurry from the purge tank 41 to a disposal canister fill and dewatering station 50 ("disposal canister station").

The disposal canister station 50 is located beneath the surface of the water volume 12 to provide radiological shielding to personnel. Canisters 51 suitable for confining the concentrated particulate are remotely filled through a fill line 52 and dewatered through a dewatering line 53 by means of a filter 54 inside the canister 51. A vacuum pump 55 and/or pressure source (e.g., air, nitrogen, or inert gas) assist the dewatering process with the removed water being returned through the dewatering line 53 to the cut zone enclosure 11 after passing through a polishing filter 56 (typically 0.3 to 0.5 micron), thereby maintaining a closed-loop system. A hood 57 is placed over the disposal canister station 50 and has an outlet 58 in communication with a HEPA gas filtration system 59 for purging gas from an area above the disposal canister station 50.

Small size particles (typically less than 15 to 50 microns), which are not removed from the water as concentrate in the solid media filter module 30, are directed to a cartridge filter module 60. The cartridge filter module 60 includes a plurality of cartridge filters 61, 62 sized to handle the full flushing flow rate from the solid media filter module 30. The cartridge filters 61, 62 preferably include at least one coarse filter 61 and at least one find filter 62 for removing particles in at least two stages based on a size of the particles. The water flow leaving the cartridge filter module 60 is redirected to the cut zone enclosure 11 to maintain a closed-loop system.

The filtration system 10 includes several design features to facilitate operation and maintenance, and to reduce the radiation dose to personnel. For example, the equipment of the filtration system 10 is packaged in modules as described above to allow easy removal and replacement of each module or station separate from the other components of the filtration system. The equipment also includes remotely operable disconnects and isolation valves on each module and between major components within the modules to facilitate removal and replacement.

Instrumentation including a flow meter 70 and pressure transducers 71 with remote indicators 72, 73 are included to monitor the performance of the filtration system 10. The system contains sufficient redundancy to eliminate or minimize the need to stop cutting operations for filtration system servicing, including the filling and handling of the waste canisters 23, 51. The system can be operated with a minimum of attendance, thereby reducing the radiation dose to operating personnel in the pool area 12.

The filtration system according to the present invention has the following advantages over systems that are commonly used during the segmentation of activated reactor vessel internals and components.

The filtration system 10 is a closed or nearly closed system, which prevents or minimizes contamination of the general pool area water 12. This system approach: reduces the dose to operating personnel by confining contamination; reduces cross contamination of other equipment; minimizes the post segmentation water processing complexity and expense since the volume of highly contaminated water is minimized and can be treated separately and in less time; and reduces the complexity and expense of decontamination of the general pool area walls and radiation dose to operating personnel once the water is drained.

The volume of secondary radioactive waste is minimized by separation of particle sizes. The large size particles, which are large enough to be disposed of directly with solid waste, are removed first by the separator 22. The solid media filters 31 remove additional medium size particles through concentrating and purging to a handling system 40, 50 that directly fills high integrity disposal canisters 51 that meet stabilization criteria. The low flow rate of the concentrated flow to the disposal canister station 50 allows using a minimum size dewatering filter 54 in the disposal canister 51. The cartridge filters 61, 62, which form the major part of secondary waste, are minimized since large size particles are removed by the flushing pump module 20 and medium size particles are removed by the solid media filter module 30, thereby leaving only a small mass of particles that the cartridge filter module 60 must remove.

The magnetic filtration system 100 according to the present invention will now be explained in detail with reference to FIG. 2. The filtration system 100 has many of the same components/modules as the filtration system 10 shown in FIG. 1 and described above. These same components/modules are identified by the same reference numerals in both drawings.

The magnetic filtration system 100 includes a magnetic filter 101 that separates the abrasive material used by the waterjet cutting process from the radioactive particles of the workpiece material being cut. Radioactive materials cut by the abrasive waterjet process will normally be stainless steel or high or low alloy carbon steel. These materials possess different magnetic susceptibilities that can be used to differentiate between the radioactive workpiece material and the abrasive waterjet material.

According to the present invention, the waterjet abrasive will be selected based on the material being cut. For high or low alloy carbon steels, which have a high magnetic susceptibility, a typical garnet, alluvial material, or other conventional abrasive material having a low magnetic susceptibility will be used. For stainless steels where the cutting debris exhibits little or no magnetic susceptibility after cutting, an abrasive material having a high magnetic susceptibility, such as a cast steel, stainless steel or shot, will be used. Where stainless steel cutting debris exhibits high magnetic susceptibility due to the hardening caused by the cutting process, a garnet, alluvial, or other conventional abrasive material having a low magnetic susceptibility will be used.

The magnetic filter 101 removes the material having a high magnetic susceptibility from the waste stream discharged from the pump module 20. The material having a high magnetic susceptibility may be either the radioactive debris particulate or the abrasive material as described above. At periodic intervals, the contents of the magnetic filter 101 are purged by de-energizing the magnets 102 of the filter and using air injection, scrapers, and/or a water flush. The slurry of material having a high magnetic susceptibility is then discharged from the magnetic filter 101 through a first outlet 103. The remainder of the waste stream, absent the material having a high magnetic susceptibility, passes through and is discharged from the magnetic filter 101 through a second outlet 104.

A first set of valves 105, 106 are associated with the first outlet 103 of the magnetic filter 101, and a second set of valves 107, 108 are associated with the second outlet 104. The first set of valves 105, 106 are used to direct the material having a high magnetic susceptibility discharged from the magnetic filter 101 selectively to either a slurry pump 109 for filling a container 110 for storing the abrasive material, or to the concentrate handling module 40. The second set of valves 107, 108 are used to direct the material having a low magnetic susceptibility discharged from the magnetic filter 101 selectively to either the solid media filter module 30, or the slurry pump 109 for filling the container 110.

The first and second sets of valves 105–108 are controlled by the controller 33 from a remote location based on the type of material being cut. If the radioactive material being cut has a high magnetic susceptibility, the first set of valves 105, 106 will cause the radioactive debris to pass to the concentrate handling module 40, and the second set of valves 107, 108 will cause the waterjet abrasive having a low magnetic susceptibility to pass to the slurry pump 109 for filling the container 110. If the radioactive material being cut has a low magnetic susceptibility, the second set of valves 107, 108 will cause the radioactive debris to pass to the solid media filter module 30, and the first set of valves 105, 106 will cause the waterjet abrasive to pass to the slurry pump 109 for filling the container 110.

The container 110 for storing the abrasive material is a large polypropylene high integrity container (HIC) commonly used for bulk disposal of low level contaminated waste. The container 110 provides a relatively low cost disposal option as compared to the disposal canister 51 described above. Other suitable types of containers can also be used that meet these criteria.

The magnetic filtration system 100 according to the present invention provides several advantages over the existing technology. The magnetic filter 101 separates a substantial portion of the nonradioactive abrasive particles from the high level radioactive particulate being cut, thereby significantly reducing the volume and disposal cost of GTCC waste and allowing disposal of the major portion of the abrasive by less costly means (the acronym "GTCC" refers to Greater Than Class "C" waste as defined by 10 CFR Part 61). The nonradioactive abrasive particles, which represent secondary waste, can be handled and disposed of by more conventional and less costly methods since the magnetic separation process will have removed a majority of the radioactive particulate from this waste stream.

The magnetic filter 101 is used in conjunction with a closed-loop, cut zone filtration system to minimize contamination of the general pool area water, and to minimize the volumes of high and low level radioactive waste by separating particle sizes.

The abrasive material having a high magnetic susceptibility, when used, can be of a structure and hardness that will minimize the amount of fracturing or breakdown (i.e., sufficient hardness to cut yet ductile enough to minimize fracturing) of the abrasive during the cutting process relative to the conventionally used garnet or alluvial material, which experience significant breakdown into small particle sizes. The larger particle size of the abrasive material having a high magnetic susceptibility will result in particles that are also more readily captured by the solid media filters 31 and/or the cartridge filters 61, 62.

The magnetic filter 101 can also be used to capture all of the cutting waste (abrasive and radioactive cut material) where differentiation between the materials is not possible or practical, thereby minimizing or eliminating the use of consumable cartridge filters that otherwise result in increased secondary waste. The use of the magnetic filter 101 to capture both the abrasive and radioactive cut material has an advantage over the use of the solid media filters 31 because the magnetic filter 101 can remove waterjet process fines that are smaller than the practical size that can be filtered by the solid media filters 31 operating as described above.

It will be appreciated that the present invention is not limited to the exact constructions that have been described above and illustrated in the accompanying drawings, and that various modifications and changes can be made without departing from the scope and spirit of the invention. It is intended that the scope of the invention only be limited by the appended claims.

What is claimed is:

1. A method of separating radioactive cut material from nonradioactive abrasive cutting material, comprising the steps of:
   determining a magnetic susceptibility of a radioactive material to be cut;
   selecting an abrasive cutting material to be used with a waterjet cutting tool such that the abrasive cutting material has a different magnetic susceptibility than said radioactive material to be cut;
   capturing a mixture of radioactive cut material and abrasive cutting material generated during operation of the watejet cutting tool; and
   separating the radioactive cut material from the abrasive cutting material using a magnetic filter.

2. The method of claim 1, further comprising the steps of directing the abrasive cutting material from the magnetic filter to a storage container for low level contaminated waste, and directing the radioactive cut material from the magnetic filter to a storage canister for high level radioactive waste.

3. The method of claim 1, wherein said step of selecting an abrasive cutting material comprises selecting an abrasive cutting material with a high magnetic susceptibility if the radioactive cut material has a low magnetic susceptibility, or selecting an abrasive cutting material with a low magnetic susceptibility if the radioactive cut material has a high magnetic susceptibility.

4. The method of claim 1, further comprising the steps of:
   placing an enclosure in a fluid volume for isolating a portion of the fluid volume from a remainder of the fluid volume;
   capturing the mixture of radioactive cut material and abrasive cutting material within said enclosure;
   filtering the radioactive cut material from a fluid stream discharged from the magnetic filter; and
   returning fluid from the fluid stream back into the isolated portion of the fluid volume.

5. The method of claim 1, wherein said step of selecting an abrasive cutting material comprises selecting garnet when the radioactive cut material is high alloy carbon steel.

6. The method of claim 1, wherein said step of selecting an abrasive cutting material comprises selecting alluvial material when the radioactive cut material is high alloy carbon steel.

7. The method of claim 1, wherein said step of selecting an abrasive cutting material comprises selecting garnet when the radioactive cut material is low alloy carbon steel.

8. The method of claim 1, wherein said step of selecting an abrasive cutting material comprises selecting alluvial material when the radioactive cut material is low alloy carbon steel.

9. The method of claim 1, wherein said step of selecting an abrasive cutting material comprises selecting cast steel having a high magnetic susceptibility if the radioactive cut material is stainless steel exhibiting no magnetic susceptibility.

10. The method of claim 1, wherein said step of selecting an abrasive cutting material comprises selecting stainless steel having a high magnetic susceptibility if the radioactive cut material is stainless steel exhibiting no magnetic susceptibility.

11. The method of claim 1, wherein said step of selecting an abrasive cutting material comprises selecting shot having a high magnetic susceptibility if the radioactive cut material is stainless steel exhibiting no magnetic susceptibility.

* * * * *